United States Patent
Larsson

[11] Patent Number: 5,435,590
[45] Date of Patent: Jul. 25, 1995

[54] MEANS FOR LIMITING THE STEERING MOVEMENT OF A VEHICLE

[75] Inventor: Lars Larsson, Partille, Sweden

[73] Assignee: AB Volvo, Sweden

[21] Appl. No.: 140,179

[22] PCT Filed: May 19, 1992

[86] PCT No.: PCT/SE92/00329
§ 371 Date: Apr. 19, 1994
§ 102(e) Date: Apr. 19, 1994

[87] PCT Pub. No.: WO92/21547
PCT Pub. Date: Dec. 10, 1992

[30] Foreign Application Priority Data
Jun. 7, 1991 [SE] Sweden .................. 9101753

[51] Int. Cl.6 .................................. B62D 7/16
[52] U.S. Cl. ........................ 280/673; 180/257
[58] Field of Search ............ 280/673, 96.1; 180/257, 180/250

[56] References Cited
U.S. PATENT DOCUMENTS

| | | | |
|---|---|---|---|
| 1,981,173 | 11/1934 | Herrington | 180/257 |
| 2,356,164 | 8/1944 | Keese | 180/254 |
| 3,191,708 | 6/1965 | Simonds et al. | 180/250 |
| 4,327,927 | 5/1982 | Tanaka et al. | 280/673 |
| 4,653,773 | 3/1987 | Graft | 280/673 |
| 5,052,528 | 10/1991 | Sullivan | 280/673 |

Primary Examiner—Kenneth R. Rice
Attorney, Agent, or Firm—Lerner, David, Littenberg, Krumholz & Mentlik

[57] ABSTRACT

The invention relates to a means for limiting angular displacement by the steering mechanism for the wheels of a vehicle by providing a pin-shaped stroke limiter on the steering knuckle for one of the front wheels which coacts with an adjustable, removable and exchangeable stop on the suspension arm for this wheel. The stroke limiter has a curved abutment surface which on angular movement of the wheel abuts against the adjustable stop on the suspension arm, at different levels and at various positions of the suspension arm. The relative movement of the curved abutment surface of the pin-shaped stroke limiter may be oblique to the surface of the adjustable stop.

21 Claims, 6 Drawing Sheets

MEANS FOR LIMITING THE STEERING MOVEMENT OF A VEHICLE

FIELD OF THE INVENTION

The present invention relates to a means for limiting the steering movement of a vehicle, especially cars.

BACKGROUND OF THE INVENTION

It is commonly known that upon turning the steering arrangement for the front wheels of a vehicle, a limitation of the swinging movement of the wheels must be present. The reason for this is mainly that must at all time be free and not contact any of the surrounding parts of the vehicle otherwise the wheels or the vehicle could be damaged or the turning movement of the steering arrangement or angular displacement of the wheels influenced disadvantageously. This desired limitation of the steering movement of the wheels of the vehicle can be obtained in different ways by some means which can be present in the steering arrangement for the wheels of the vehicle and down to the support for the wheels. These arrangements are mainly based on the fact that some part of the steering arrangement shall abut against some rigid part in the vehicle so that the swinging movement is limited. One example of such a device is shown in the U.S. Pat. No. 4,653,773 which describes an adjustable pin on the steering arrangement intended to abut against an adjacent surface of the able housing.

The front part of a car is always spring suspended. This means that it can move both vertically and to some extent horizontally in relation to the wheels which necessarily must be on the ground. The wheels and other devices which are united to the wheels are adjusted in a sophisticated way in relation to the car as such for obtaining the optimal driving properties etc. When however the car is moving on the springs in some direction then this adjustment will be influenced and it can be necessary with an automatic regulation of the adjustment when this springing movements occurs. It can for instance be so that if the wheels have been swung maximally and the swinging movement limiter for the wheels abuts some part of the car then for example on an uneven way when side acceleration or braking occurs, tires of the wheels can come into contact with the forward side beams or other part of the car. The movement limitation should therefore be made in such a way that at such conditions it is changed so that the wheels all the time are free.

SUMMARY AND OBJECTS OF THE INVENTION

According to the present invention one has solved the above mentioned problems are overcome by improved means for limiting the steering movement or angular displacement of the wheels of a vehicle in relation to actual vehicle spring suspension which is characterized in that on the steering knuckle is arranged a pin shaped, stroke limiter having a curved abutment surface which at full angular displacement of the steering assembly abuts against the suspension arm and the arranged adjustable and exchangeable stop for limiting angular movement of the front wheels of the vehicle.

According to the invention the surface of the stop against the stroke limiter can be oblique in relation to the moving direction of the stroke limiter.

Further, according to the invention the connecting surface of the stop against the suspension arm can also be oblique in relation to the moving direction of the stroke limiter.

The mutual coacting surfaces of the stroke limiter and stop on the suspension arm can for the purpose of the adjustment and angular limits of the movement of the front wheel of the vehicle according to the invention be step- or waveshaped.

According to the invention the stop can be locked at the suspension arm by means of friction and/or spring tension.

DESCRIPTION OF THE FIGURES

Other objects and advantages of the present invention will become apparent from the description and the appended claims which follow taken in conjunction with the following drawings:

BRIEF DESCRIPTION OF THE DRAWINGS

Figure 1:
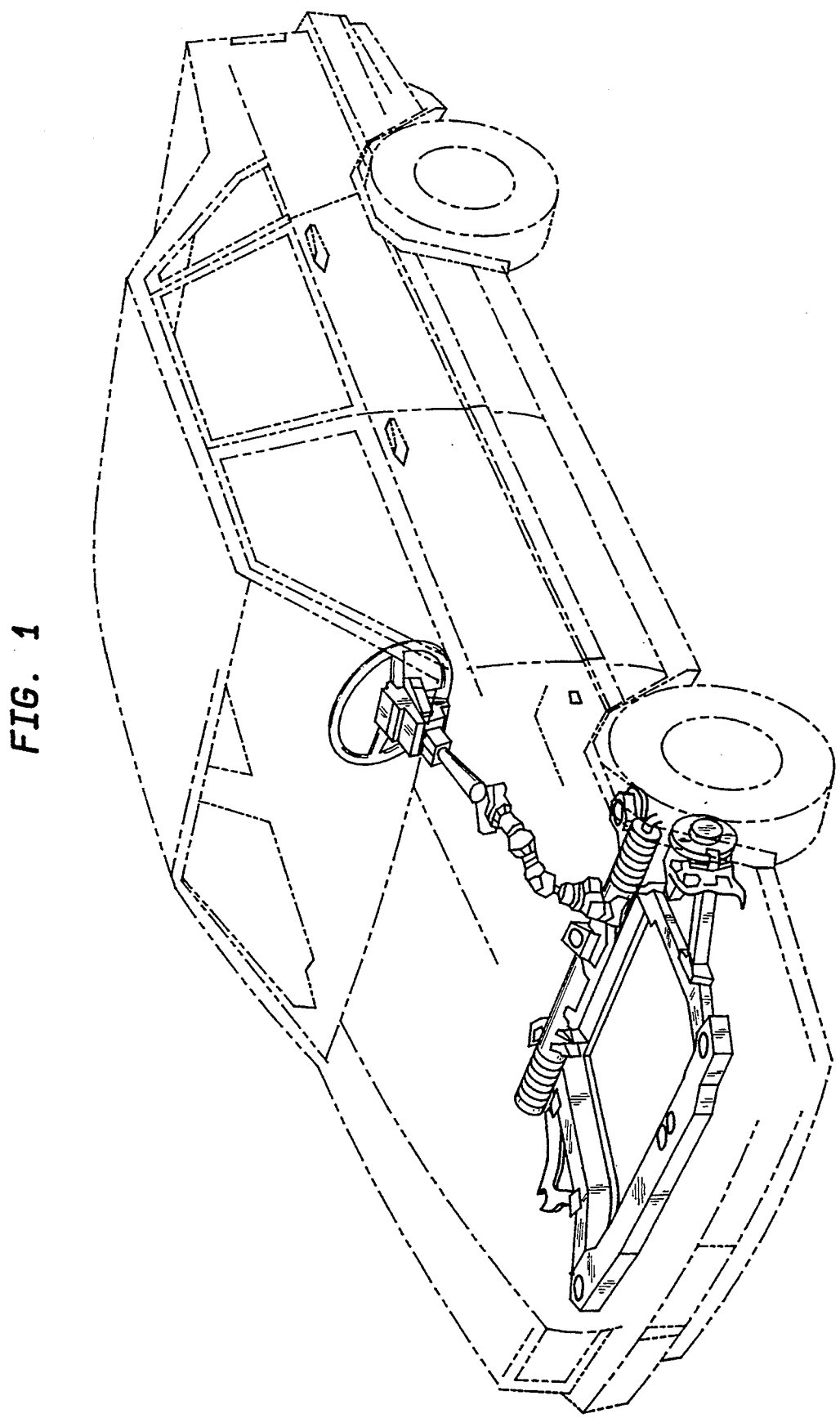
Figure 2:
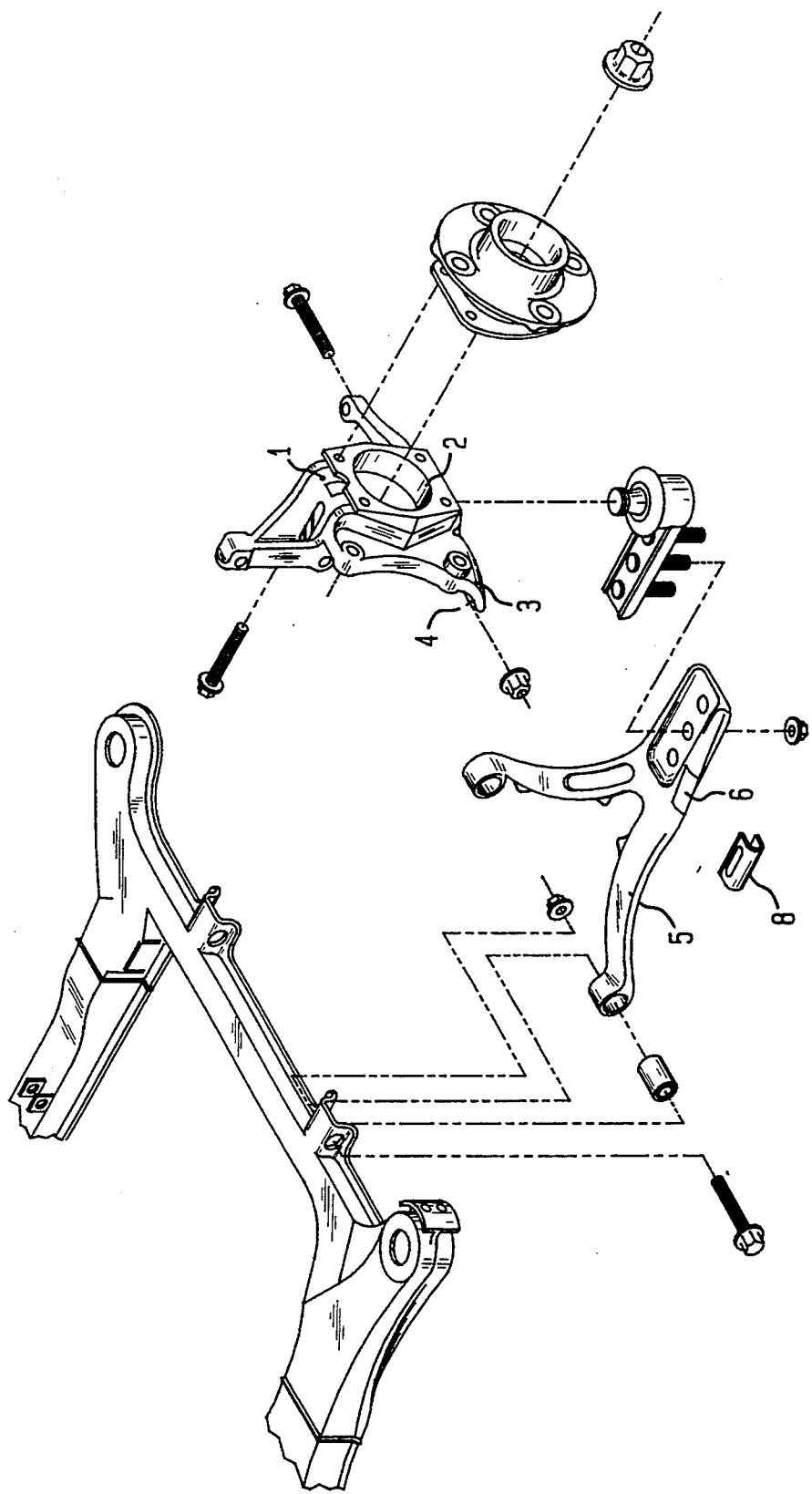
Figure 3:
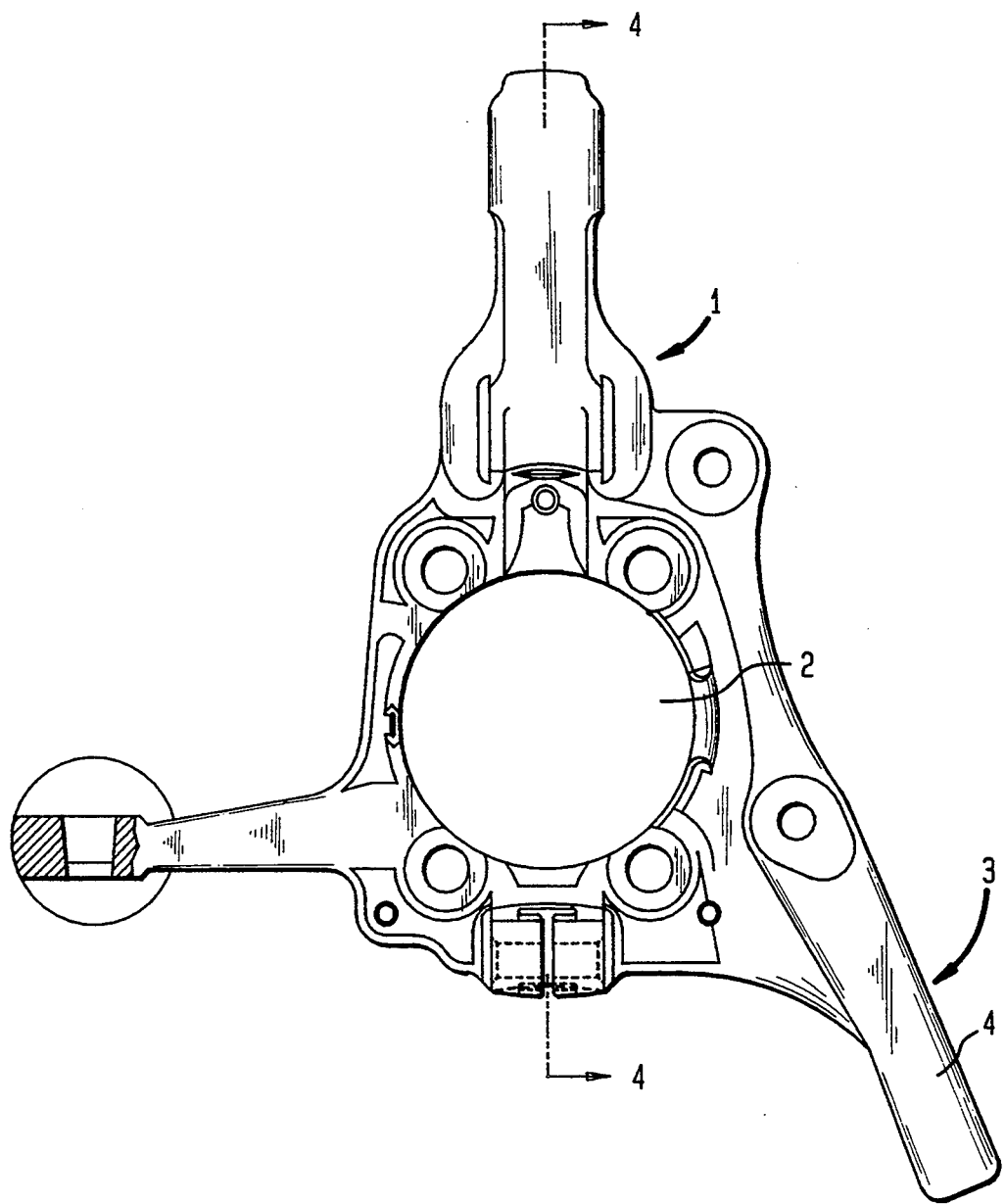
Figure 4:
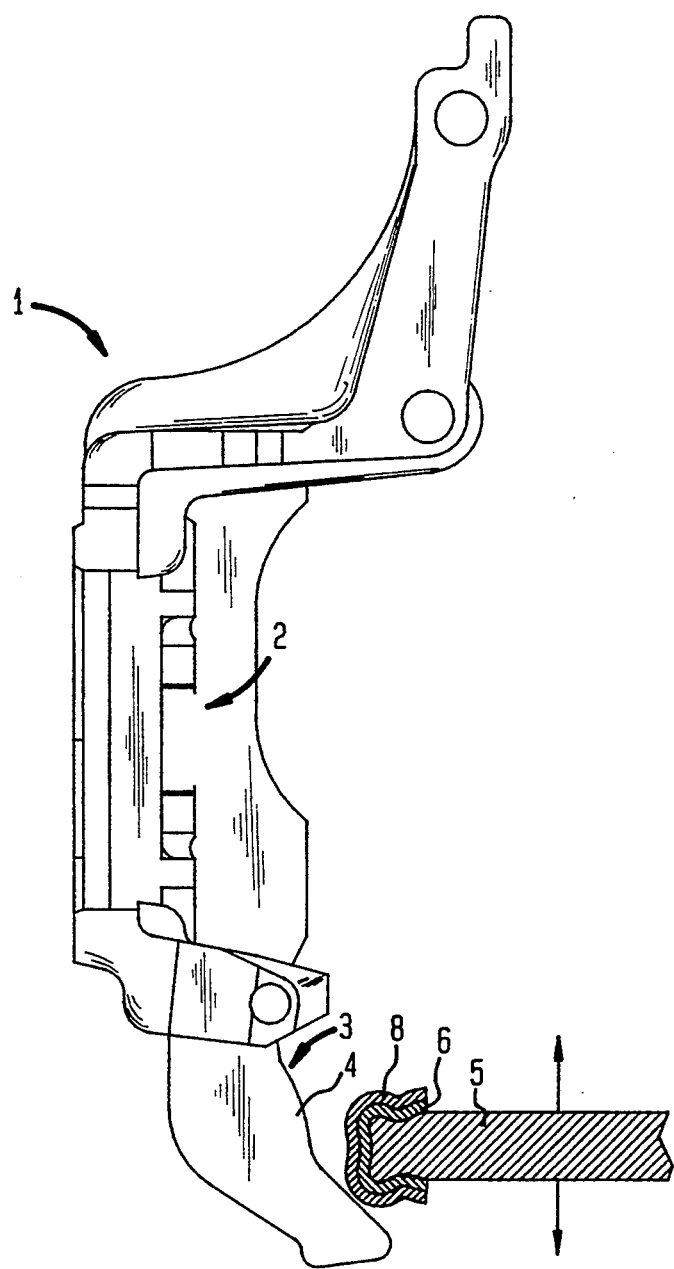
Figure 5:
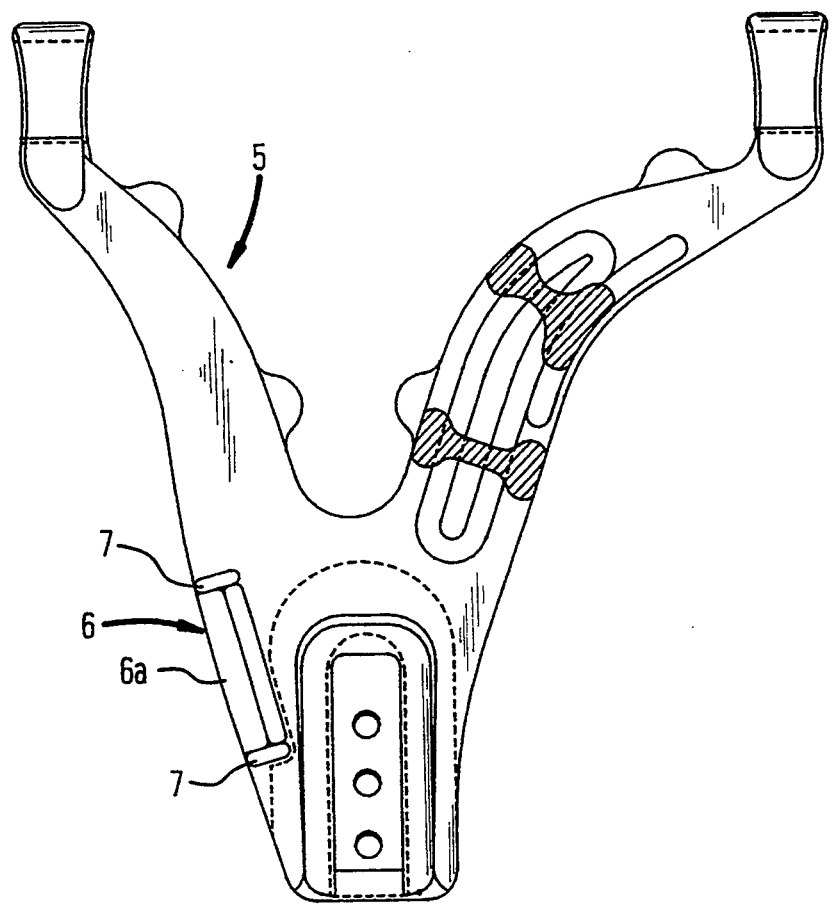
Figure 6A:
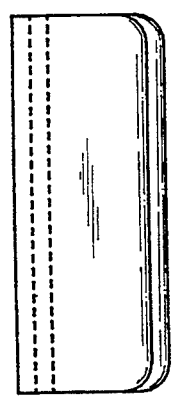
Figure 6B:
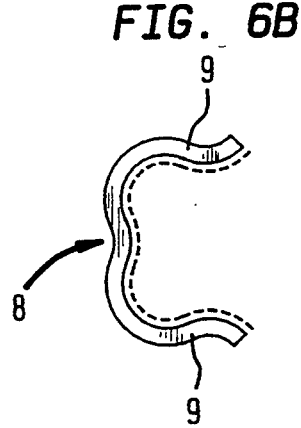
Figure 7:
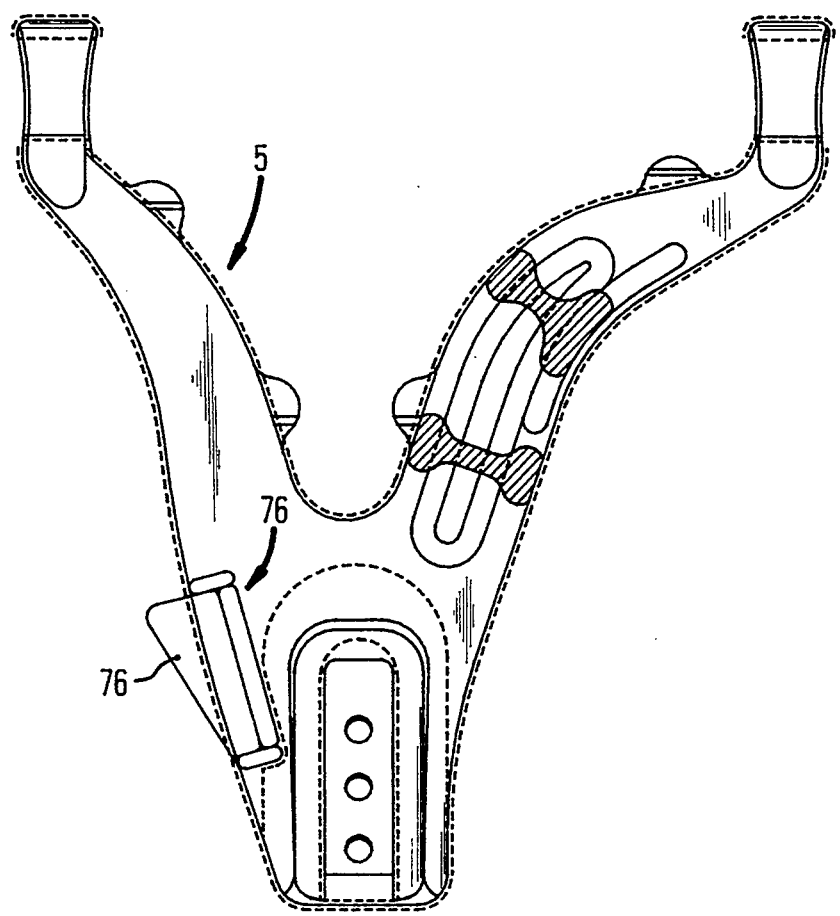
Figure 8A:
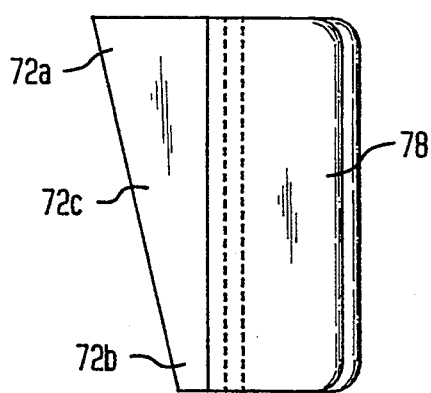
Figure 8B:
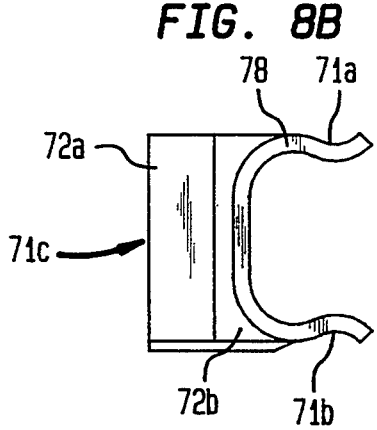

FIG. 1 is a schematic view of one form of steering arrangement for a vehicle using the present invention;

FIG. 2 is an exploded view of the front section of the vehicle shown in FIG. 1, showing a fragment of the frame, and showing the interrelation of the suspension arm and steering knuckle in accordance with the invention;

FIG. 3 is an inner or back side elevational view of the steering knuckle shown in FIGS. 1 and 2 of the drawings;

FIG. 4 is a cross-section of the steering knuckle taken on line 4—4 of FIG. 3 showing a fragment of the suspension arm and the adjustable, removable and exchangeable stop also in cross-section;

FIG. 5 is a plan view of the suspension arm shown in FIGS. 1 and 2 of the drawings with one form of adjustable, removable and exchangeable stop in assembled position thereon;

FIG. 6A is a top plan view of the form of adjustable, removable and exchangeable stop shown in FIG. 5;

FIG. 6B is an end view of the adjustable, removable and exchangeable stop shown in FIG. 6A;

FIG. 7 is a plan view of the suspension arm shown in FIGS. 1 and 2 with the form of the adjustable, removable and exchangeable stop having a step shape;

FIG. 8A is a top plan view of the form of adjustable, removable and exchangeable stop shown in FIG. 7; and FIG. 8B is an end view of the form of adjustable, removable and exchangeable stop shown in FIG. 8A.

BRIEF DESCRIPTION OF ONE PREFERRED EMBODIMENTS

Referring to the drawings, FIGS. 1 and 2 are schematic views of a vehicle embodying the present invention, particularly showing the interrelation of the stroke limiter on the steering knuckle and the stop assembly on the suspension arm.

FIGS. 1, 2 and 3 show a steering knuckle 1 which has a central circular hole 2 for the wheel hub and usual attachment and connecting means for the spring strut, steering connecting rod etc. In the embodiment of the present invention the stroke limiter 3 is shown as a protruding pin like member 3 on the steering knuckle 1 protruding pin. This member or pin 3 is on substantially straight but on the inner or back surface, remote from the associated wheel, has a predetermined curved surface as at 4 for purposes that will be clear from the description below.

FIG. 4 shows the same steering knuckle 1, in section. The pin shaped stroke limiter 3 which in this figure is shown from the side is curved to form the abutment surface 4 which is intended to abut against the stop 8, formed on the suspension arm 5 as is also more fully described below.

In the exploded perspective view at FIG. 2 the suspension arm 5 and one form of the stop 8 are shown.

FIG. 5 shows the suspension arm 5 against which the stroke limiter 3 curved abutment surface 4 of the will abut at full angular displacement of the wheels. This suspension arm 5 which is of a relatively conventional kind has a stop assembly as at 6 against which the stroke limiter shall abut. This stop assembly 6 is according to the invention includes the stop 8 which is preferably made from some form of resilient material such as steel. Those skilled in the art will recognize that the stop 8 may be made of other materials such as a reinforced plastic to control the noise of the surface to surface contact between the curved abutment surface 4 of the stroke limiter and the coacting surface 8a of the stop 8 during operation of the present invention.

The assembly 6 has a surface as at 6a which can have an even shape and will be limited in length the spaced protrusions 7a and 7b.

The suspension arm 5 which has a limited thickness can be made of light metal which is desirable as the part of a vehicle which is not springloaded shall be as light as possible. Light metal is usually not abrasion resistant so that a mounted stop 8 of steel around the surface 6a of the stop assembly 6 makes it possible to produce the suspension arm 5 from aluminium.

FIG. 6 shows finally a stop 8 which can be snapped on the surface 6a of the stop assembly 6 on the suspension arm 5. One form of the stop 8 has a longitudinal shape and a section in the shape of a modified U with inwardly bent legs 9. The reason for this is that the stop shall be passed on the suspension arm 5 and be locked at this through the cooperation between the legs 9 with recesses 10 formed in the surface 6a in the suspension arm.

As the stop 8 can be snapped on the suspension arm 5 in a simple way it is also easy to remove the stop 8 and replace and exchange it with and replace it by another stop. This can be advantageous when one wants to change the limitation of the angular displacement of the steering mechanism. An example of this would be decreasing the angular displacement by having the stop 8 meet the stroke limiter 3 at an earlier stage. This is desirable if one puts on bigger tires on the wheels so that one has to have a somewhat smaller stroke limit to prevent the tires from touching the forward side beams or something else. The new stop can for example have a thicker wall thickness or it can be made with a protruding back or the like, which stops the stroke limiter at an earlier stage.

Another way to change the stroke limit for the steering is to make the stop 8 in such a way that the abutment 4 surface thereon becomes oblique in relation to the moving direction of the stroke limiter 3 and to make it possible to displace the stop 8 in its longitudinal direction. One can also let the surface of the stop against the stroke limiter be perpendicular in relation to this and instead let the abutting surfaces of the stop against the suspension arm be oblique so that one gets the same change of the angular displacement of the steering mechanism. If one chooses these oblique surfaces to adjust the steering movement limit with only one stop then the connecting surface on the stop and the suspension arm can be wave shaped or step shaped so that one can move the stop in a desired direction and to one predetermined position depending on the size of the tires on the wheels.

This is illustrated by reference to FIG. 4 of the drawings in which the curved abutment surface 4 of the stroke limiter 3 is shown in abutting relation with the stop 8 adapted to move generally vertically as shown by the arrows. This permits the curved abutment surface 4 to engage the stop 8 at various angles and at various levels depending on the degree of compression of the vehicle spring supports.

The reason that one has given the pin shaped stroke limiter a curved abutment surface 4 is that the angular displacement of the steering mechanism shall be different at different suspension compression of the forward part of the vehicle. The vehicle should namely have its smallest turning diameter when one drives slowly on an even road with maximum angular displacement of the steering mechanism. If the wheels at the full angular displacement however are moved inwards due to the spring action or due to for example an uneven road surface, high side acceleration or braking the stroke limiter has got such a shape that it will come into contact with the stop on the suspension arm and presses thereby the wheels back so that the tires will not come into contact with for example the formed side beams.

At FIG. 7, a further form of stop member 78 is affixed in the stop assembly 76 formed on the suspension arm 5. As was above indicated for the form of the stop member shown at FIGS. 5, 6A and 6B of the drawings, stop member 78 has a predetermined length to fit the stop assembly 76, is U-shaped in cross-section to define spaced and curved legs as at 71a and 71b so that it can be snapped or friction fitted into assembled position. However, this form of the stop differs in that it is provided with a stepped side face as at 71c shaped for operative coaction with the curved abutment surface 4 of the stroke limiter 3 when the present invention is in operation. The stepped face 71c is established by an inclined surface having a thicker end as at 72a which slants to a thinner end as at 72b, thus effectively providing automatic adjustment of the angle of contact between the stroke limiter and the stop means with angular movement of the wheels in relation to the various levels and positions of the suspension arm 5 during operation of the vehicle.

The invention is not limited to the embodiment example shown but can be varied in different ways with in the scope of the claims.

What is claimed is:

1. Apparatus for limiting the steering movement for the front wheels of a vehicle in relation to variations of the actual vehicle suspension means comprising:

suspension arm means for at least one of the front wheels for the vehicle having, an adjustable stop means detachably connectable on the suspension arm;

steering knuckle means for supporting and turning at least one of the front wheels of the vehicle having, stroke limiter means, said stroke limiter means having, at least one curved abutment surface, and said at least one curved abutment surface of said stroke limiter means on movement of said steering knuckle means to abut against the stop means on the suspension arm means at all varying levels and positions of said suspension arm means to limit the angular movement of the front wheels of the vehicle.

2. An apparatus as in claim 1, wherein the surface of the stop means and the surface of the stroke limiter means are oblique in relation to each other and to the direction of movement of the stroke limiter means.

3. An apparatus as in claim 1 or 2, wherein the stroke limiter means is pin-shaped.

4. An apparatus as in claim 1 or 2, wherein the stop means is made of resilient material.

5. An apparatus as in claim 1 or 2 wherein the stop means has an abutting surface that is step-shaped.

6. An apparatus as in claim 1 or 2 wherein,
the suspension arm means has, a stop assembly with a connecting and shaped surface means formed on the suspension arm,
the adjustable stop means includes, connecting means to coact with the connecting and shaped surface means on the suspension arm means.

7. An apparatus as in any one of claims 6 wherein the connecting means on the stop means provides a friction fit in assembled position on connecting and shaped surface means on the suspension arms means.

8. An apparatus as in any one of claims 6 wherein the connecting means on the stop means is resilient to establish spring tension between the suspension arm means and the stop means when the stop means is in assembled position on the connecting and shaped surface means on the suspension arm means.

9. An apparatus as in claim 1 or 2 wherein the suspension arm means is made from light metal.

10. An apparatus as in claim 1 or 2 wherein the suspension arm means is made from aluminum.

11. An apparatus as in claim 1 or 2 wherein,
the stop means is made of resilient material and is generally U-shaped in cross-section to define coacting spaced legs,
said spaced legs are shaped for frictional engagement with the suspension arm means.

12. An apparatus for limiting the steering movement of the wheels of a vehicle in relation to variations in the actual vehicle suspension means comprising,
steering knuckle means for supporting and turning at least one of the wheels of the vehicle,
said steering knuckle means having, a pin-shaped stroke limiter with a predetermined curved inner surface and movable with the steering knuckle means,
suspension arm means for said at least one of the wheels of the vehicle having, a stop assembly,
said stop assembly including, an adjustable stop means detachably mounted on the suspension arm, and
said adjustable stop means having, a coacting surface in relation to the direction of movement of the stroke limiter whereby the inner surface of the curved abutment surface on the stroke limiter will abut against the coacting surface of the adjustable stop means at all levels and positions of the suspension arm.

13. An apparatus as in claim 12, wherein the surface of the stop means and the surface of the stroke limiter means are oblique in relation to each other and to the direction of movement of the stroke limiter means.

14. An apparatus as in claim 12 or 13, wherein,
said stop means has, spaced leg means,
said spaced leg means are inwardly bent and shaped like a modified-U for frictional engagement in assembled position on the suspension arm means.

15. An apparatus as in claim 12 or 13 wherein,
the suspension arm means has, a stop assembly with a connecting and shaped surface means formed on the suspension arm,
the adjustable stop means includes, connecting means to coact with the connecting and shaped surface means on the suspension arm means.

16. An apparatus as in any one of claims 15 wherein the connecting means on the stop means provides a friction fit in assembled position on the connecting and shaped surface means on the suspension arms means.

17. An apparatus as in any one of claims 15 wherein the connecting means on the stop means is resilient to establish spring tension between the suspension arm means and the stop means when the stop means is in assembled position on the suspension arm means.

18. An apparatus as in claim 12 or 13 wherein the suspension arm means is made from light metal.

19. An apparatus as in any one of said claims 23 wherein the suspension arm means is made from aluminum.

20. An apparatus as in claim 12 or 13 wherein,
the suspension arm means includes, a stop assembly with a connecting and shaped surface means on the suspension arm means,
said connecting and shaped surface means includes, recess means, and
the stop means has, a plurality of coacting legs disposed to engage the recess means when in assembled position on the suspension arm means.

21. An apparatus as in claim 1 or 12 wherein the stop means is removable and exchangeable.

* * * * *

UNITED STATES PATENT AND TRADEMARK OFFICE
CERTIFICATE OF CORRECTION

PATENT NO. : 5,435,590
DATED : July 25, 1995
INVENTOR(S) : Larsson

It is certified that error appears in the above-identified patent and that said Letters Patent is hereby corrected as shown below:

```
Column 1, line 13, after "that" insert --the wheels--.
Column 1, line 14, "time" should read --times--.
Column 1, line 29, "able" should read --axle--.
Column 1, line 40, "movements" should read --movement--.
Column 1, line 53, cancel the words "one has solved".
Column 1, lines 61-62, cancel the word "arranged".
Column 2, line 12, cancel the heading "DESCRIPTION OF THE
     FIGURES".
Column 2, line 51, "EMBODIMENTS" should read "EMBODIMENT".
Column 2, line 64, cancel the words "protruding pin".
Column 2, line 64, cancel the word "on".
Column 3, line 10, "stroke limited 3 curved abutment surface 4
     of the will" should read --curved abutment surface 4 of
     the stroke limiter 3 will--.
Column 3, line 24, after the word "length" insert --by--.
Column 3, line 44, cancel the words "and replace it by".
Column 3, line 59, "4 surface" should read --surface 4--.
Column 4, line 50, "with in" should read --within--.
Column 5, line 24, "arms" should read --arm--.
Column 6, line 27, "any one of claims" should read --claim--.
Column 6, line 30, "arms" should read --arm--.
Column 6, line 31, "any one of claims" should read --claim--.
```

Signed and Sealed this

Twelfth Day of December, 1995

Attest:

BRUCE LEHMAN

*Attesting Officer*  Commissioner of Patents and Trademarks